United States Patent [19]

Torii et al.

[11] Patent Number: 4,813,844
[45] Date of Patent: Mar. 21, 1989

[54] APPARATUS FOR SETTING INDUSTRIAL ROBOT AT STANDARD POSITION

[75] Inventors: Nobutoshi Torii, Hachioji; Ryo Nihei, Musashino; Hitoshi Mizuno, Hino, all of Japan

[73] Assignee: Fanuc Ltd., Yamanashi, Japan

[21] Appl. No.: 21,059

[22] PCT Filed: May 30, 1986

[86] PCT No.: PCT/JP86/00273

§ 371 Date: Jan. 29, 1987

§ 102(e) Date: Jan. 29, 1987

[87] PCT Pub. No.: WO86/06998

PCT Pub. Date: Dec. 4, 1986

[30] Foreign Application Priority Data

May 31, 1985 [JP] Japan .............................. 60-116758

[51] Int. Cl.$^4$ .............................. B25J 9/00; B25J 19/00
[52] U.S. Cl. .............................. 414/730; 901/3; 901/50
[58] Field of Search ............ 414/730; 901/2, 3, 50

[56] References Cited

U.S. PATENT DOCUMENTS

| | | |
|---|---|---|
| 3,336,676 | 8/1967 | Aldeborgh . |
| 3,496,758 | 2/1970 | Sunnen . |
| 4,372,721 | 2/1983 | Harjar et al. . |
| 4,406,069 | 9/1983 | Clement . |
| 4,481,592 | 11/1984 | Jacobs et al. ............ 901/3 X |
| 4,668,157 | 5/1987 | Kato et al. ............ 901/50 X |
| 4,702,665 | 10/1987 | Nakashima et al. .......... 901/50 X |

FOREIGN PATENT DOCUMENTS

| | | |
|---|---|---|
| 42960 | 1/1982 | European Pat. Off. . |
| 57-52602 | 3/1982 | Japan . |
| 60-20878 | 2/1985 | Japan . |
| 8500548 | 2/1985 | PCT Int'l Appl. ............ 901/50 |
| 1603673 | 11/1981 | United Kingdom . |

OTHER PUBLICATIONS

"Methods for Checking the Operating Accuracy of Industrial Robots", *Machines & Tooling*, vol. 49, No. 8, pp. 8-11.

*Primary Examiner*—Leslie J. Paperner
*Attorney, Agent, or Firm*—Armstrong, Nikaido Marmelstein & Kubovcik

[57] ABSTRACT

An apparatus for setting an industrial robot at the standard position comprises a block (19) to be measured, which is attached to a top end portion (18) of a wrist of the industrial robot, and a supporting member (23) for the measurement, which is attached to a fixing base (11) of the industrial robot. The block has three planes (20, 21, 22), orthogonal to one another, to be measured, and the block is positioned to the top end portion of the wrist so that the three planes to be measured are set at predetermined positions relative to the top end portion of the wrist. The supporting member has three frames (24, 25, 26) orthogonal to one another, and the supporting member is positioned relative to the fixing base so that the three frames take predetermined positions relative to three-axis orthogonal coordinates predetermined on the basis of the fixing base. By a plurality of dial gauges (27 through 32; 37 through 42), the positions of the planes of the block are measured. The dial gauges display predetermined values only when the planes to be measured of the block are set at predetermined positions relative to the frames of the supporting member.

4 Claims, 5 Drawing Sheets

APPARATUS FOR SETTING INDUSTRIAL ROBOT AT STANDARD POSITION

TECHNICAL FIELD

The present invention relates to an apparatus for setting an industrial robot at a standard position. More particularly, the present invention relates to an apparatus for setting an articulated robot at a predetermined posture on the basis of a fixing base of the robot.

BACKGROUND ART

For control of the motion of an industrial robot, there is ordinarily adopted a method in which the arranged industrial robot is manually set at a predetermined standard posture and an aimed position for the motion is calculated by using positions of respective moving elements as reference values. This operation of setting the posture of the robot, that is, the operation of setting the robot at the standard position, is necessary when it is desired to change the set position of the robot or when maintenance of the robot or an exchange of tools is carried out.

Japanese Unexamined Patent Publication No. 60-20878 discloses an apparatus for determining the standard position of an articulated industrial robot. However, this apparatus is defective in that, since the rotation axis of a wrist assembly of the robot is utilized as the object of the measurement, a casing of the wrist must be dismounted for the determination and the operation is troublesome.

DISCLOSURE OF THE INVENTION

As a means for eliminating this defect, the present invention provides an apparatus for setting an industrial robot, which comprises a block to be measured, which is attached to a top end portion of a wrist of the industrial robot and has three planes, orthogonal to one another, to be measured, block-positioning means for positioning the block relative to the top end portion of the wrist so that the three planes to be measured of the block are set at predetermined positions relative to the top end portion of the wrist, a supporting member for the measurement which is attached to a fixing base of the industrial robot and has three frames orthogonal to one another, supporting member-positioning means for positioning the supporting member relative to the fixing base so that the frames take predetermined positions relative to three-axis orthogonal coordinates predetermined on the basis of the fixing base, and a plurality of dial gauges attached to predetermined positions of the frames to measure the planes to be measured of the block and to display predetermined values when the planes to be measured of the block are set at predetermined positions relative to the frames.

According to the above-mentioned apparatus, by applying the top ends of the dial gauges to the planes to be measured of the block to be measured, and adjusting the posture of the robot so that measured values displayed by the dial gauges are equal to predetermined values, the robot can be set at a predetermined posture relative to three-axis orthogonal coordinates predetermined on the basis of the fixing base. Since a casing of the wrist of the robot need not be dismounted when performing this operation, the operation of positioning the robot can be simply performed.

The foregoing and other objects and characteristics of the present invention will become apparent from the following description made with reference to the accompanying drawings.

BEST MODE FOR CARRYING OUT THE INVENTION

Figure 1:
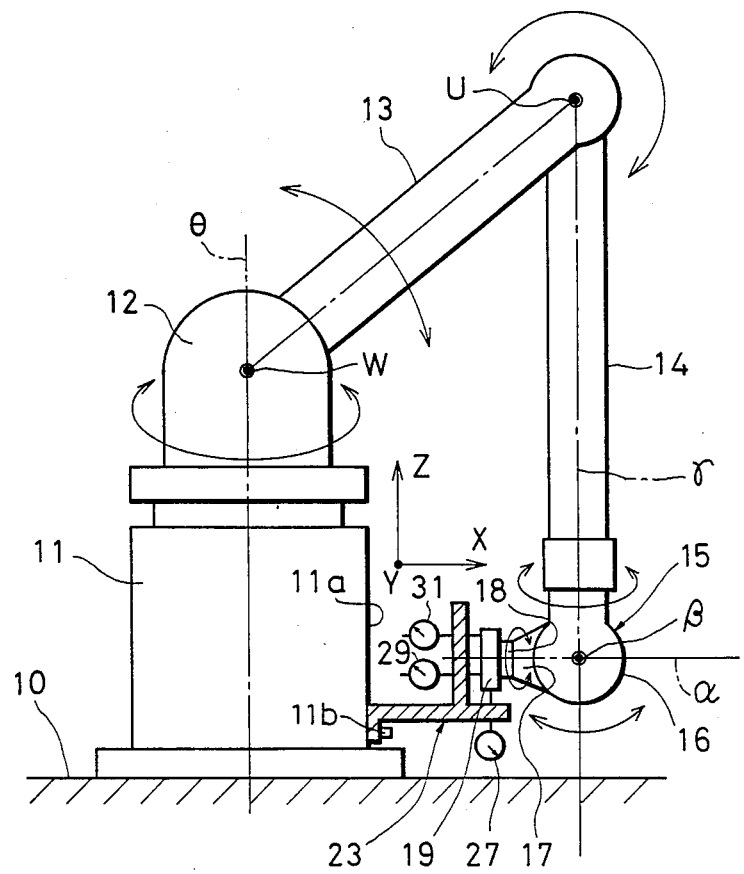
FIG. 1 is a side view, partially in section, of an embodiment of the apparatus for positioning a six-axis articulated robot according to the present invention.

FIG. 1 shows a six-axis articulated robot. This robot has a fixing base 11 fixed to a setting surface 10 such as a floor or a wall. A turning body 12 is attached to the fixing base 11 so that the body 11 can turn around the the axial line $\theta$ vertical to the setting plane 10. The base end of an upper arm 13 is attached to the turning body 12 rotatably around the axial line W orthogonal to the axial line $\theta$. The rear end of a front arm 14 is attached to the top end of the upper arm 13 rotatably around the axial line U parallel to the axial line W. A wrist base 16 of a wrist assembly 15 is attached to the top end of the front arm 14 rotatably around the longitudinal axial line $\gamma$ of the front arm 14. An intermediate portion 17 of the wrist is attached to the wrist base 16 rotatably around the axial line $\beta$ orthogonal to the axial line $\gamma$. A top end portion 18 of the wrist is attached to the intermediate portion 17 of the wrist rotatably around the axial line $\alpha$ orthogonal to the axial line $\beta$. A working tool (not shown) such as a robot hand can be attached to the top end portion 18 of the wrist, and the top end portion 18 of the wrist has a projection 18a for positioning the working tool.

A block to be measured, that is, an instrument 19, is dismountably attached to the top end portion 18 of the wrist instead of the working tool for determining the standard position of the robot. The instrument 19 has a hole to be fitted with the projection 18a of the top end portion 18 of the wrist.

Figure 2:
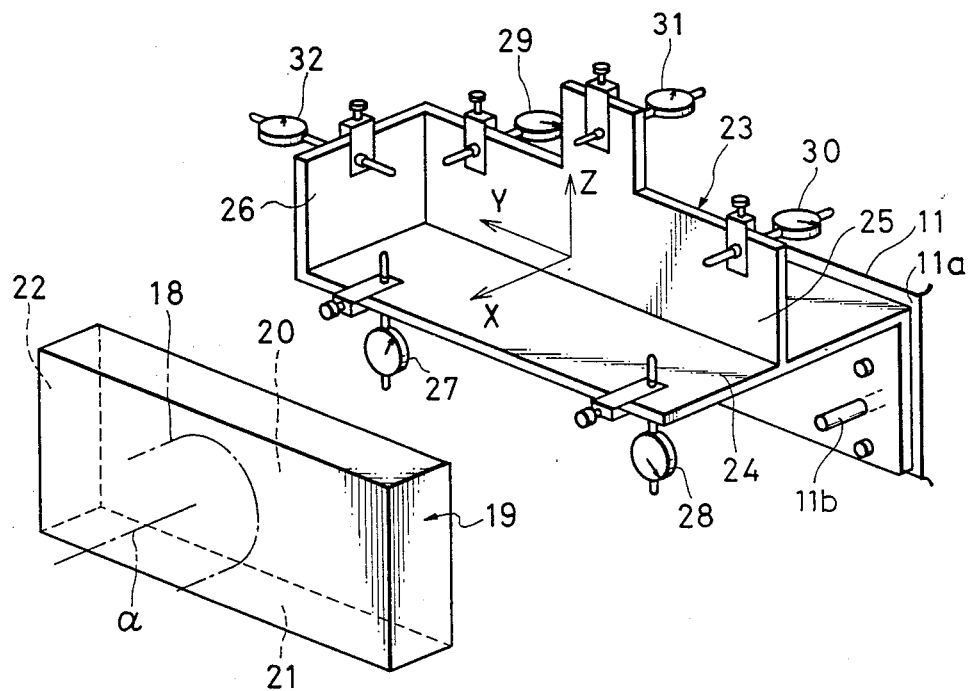
FIG. 2 is a perspective view showing the positioning apparatus shown in FIG. 1.

Referring to FIG. 2, the instrument 19 has a first plane 20 orthogonal to the axial line $\alpha$, a second plane 21 orthogonal to the first plane 20, and a third plane 22 orthogonal to the first plane 20 and second plane 21. The instrument 19 has a projection or hole (not shown) to be fitted with a positioning hole or projection formed on the top end portion 18 of the wrist. The instrument 19 is positioned relatively to the top end portion 18 of the wrist by the positioning projection 18a and the positioning hole of the instrument 19 so that the three planes of the instrument 19 are set at positions predetermined relative to the top end portion 18 of the wrist. Note, a modification may be adopted in which a positioning hole is formed on the top end portion of the wrist and a positioning projection is formed on the instrument 19.

A standard plane 11a is formed on the fixing base 11 so that the standard plane 11a is set at a predetermined position within three-axis orthogonal coordinates. An X-Y coordinate plane is set in parallel to the setting face 10 for the fixing base 11, and the Z axis is set so that it is in agreement with the axial line θ. The standard plane 11a extends in parallel to a Y-Z coordinate plane. A supporting member 23 for the measurement is dismountably attached to the standard face 11a of the fixing base 11 through bolts and is positioned relative to the standard face 11a of the fixing base 11 through a positioning pin 11b. The supporting member 23 has a first frame 24 parallel to the X-Y coordinate plane of the three-axis orthogonal coordinates, a second frame 25 parallel to the Y-Z coordinate plane, and a third frame 26 parallel to the X-Z coordinate plane.

A first dial gauge 27 and a second dial gauge 28 are attached to the first frame 24 of the supporting member 23 with a certain interval therebetween in the direction of the Y axis. The first and second dial gauges 27 and 28 are located at the predetermined same level with respect to the Y-Z coordinate plane. A third dial gauge 29 and a fourth dial gauge 30 are attached to the second frame 25 with a certain interval therebetween in the direction of the Y axis. The third and fourth dial gauges 29 and 30 are located at the predetermine same level with respect to the X-Y coordinate plane. A fifth dial gauge 31 is further attached to the second frame 25. The fifth dial gauge 31 is located at a predetermined level, different from the level of the fourth dial gauges 29 and 30, with respect to the X-Y coordinate plane. A sixth dial gauge 32 is attached to the third frame 26. These six dial gauges 27 through 32 are located at predetermined positions within the three-axis orthogonal coordinates set on the basis of the fixing base 11.

Figure 3:
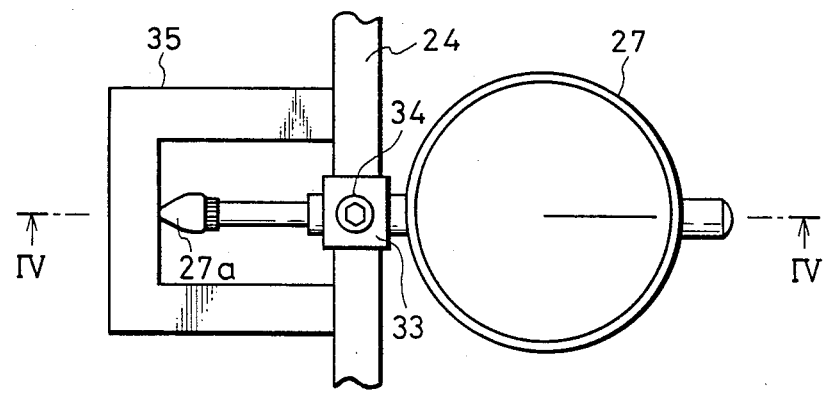
FIG. 3 is an enlarged view of the main part of the positioning apparatus shown in FIG. 2, which illustrates the method of setting dial gauges in the positioning apparatus shown in FIG. 2.
Figure 4:
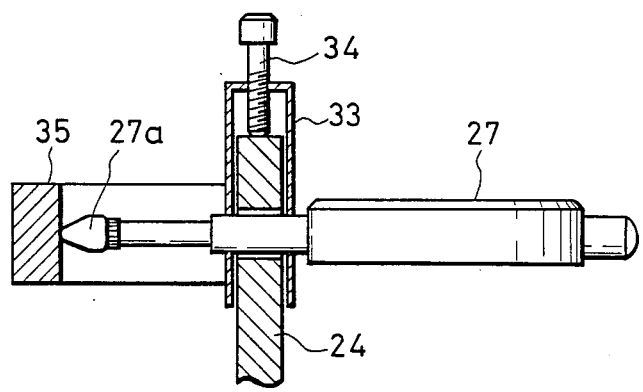
FIG. 4 is a view showing the section taken along the line IV—IV in FIG. 3.
Figure 5:
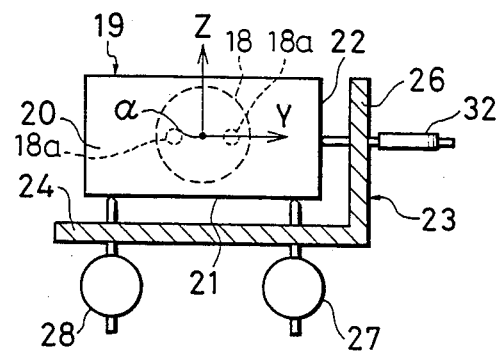
FIGS. 5 through 7 are sectional views showing the steps of the operation of the positioning apparatus shown in FIGS. 1 and 2; and, FIG. 8 is a perspective view illustrating another embodiment of the positioning apparatus according to the present invention.
Figure 6:
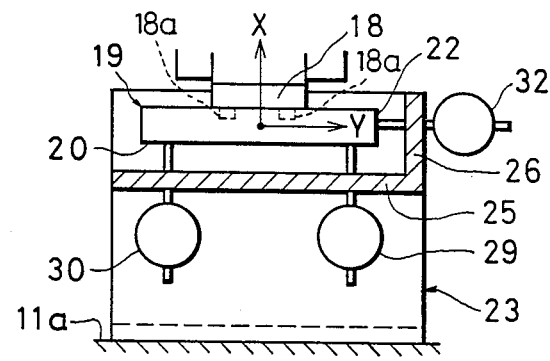
Figure 7:
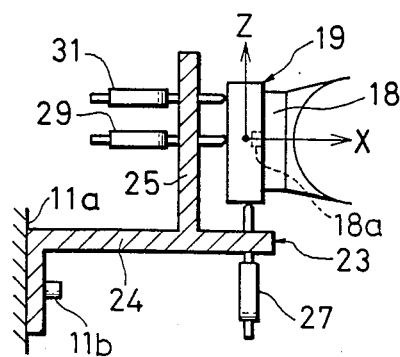

As shown in FIGS. 3 and 4, the first dial gauge 27 is secured to the first frame 24 by a holder 33 and a clamp screw 34. The other dial gauges are similarly secured by holders and clamp screws. Setting of the first dial gauge 27 is accomplished by causing the top end of a movable measuring probe 27a of the dial gauge 27 to abut against a gauge block 35 fitted to the first frame 24. The other dial gauges are similarly set.

In the operation of positioning the robot by using the positioning apparatus having the above-mentioned structure, the instrument 19 is attached to the top end portion 18 of the wrist and the supporting member 23 is attached to the standard plane 11a of the fixing base 11. At first, the longitudinal axial line γ of the front arm 14 of the robot is set substantially vertically to the setting plane 10, and the central axial line α of the top end portion of the wrist is set substantially in parallel to the setting plane 10. The position of the instrument 19 is set so that the first plane 20 of the instrument 19 confronts the second frame 25 of the supporting member 23 substantially in parallel thereto, the second plane 21 of the instrument 19 confronts the first frame 24 of the supporting member 23 substantially in parallel thereto and the third plane 22 of the instrument 19 confronts the third frame 26 of the supporting member 23 substantially in parallel thereto, whereby the position of the instrument 19 is roughly set.

The top ends of the measuring probes of the preliminarily set first dial gauge 27 and second dial gauge 28 are caused to abut against the second plane 21 of the instrument 19 so that the second plane 21 of the instrument 19 is precisely in parallel to the X-Y coordinate plane, then the position adjustment is performed so that both the dial gauges 27 and 28 display the predetermined same value, whereby the posture of the robot around the axial line α can be calibrated irrespective of the postures around the axial lines θ, W, U, γ and β.

Then, the top ends of the measuring probes of the preliminarily set third dial gauge 29 and fourth dial gauge 30 are caused to abut against the first plane 20 of the instrument 19 so that the third plane 22 of the instrument 19 is precisely in parallel to the X-Z coordinate plane. The position adjustment is performed so that both the dial gauges 29 and 30 display the predetermined same value. Simultaneously, the positions of the robot and the instrument 19 are adjusted so that the preliminarily set sixth dial gauge 32 displays a predetermined value, whereby the postures of the robot around the axial lines θ and γ can be calibrated irrespective of the postures around the axial lines W, U and β. Note, when the displayed values of the first and second dial gauges shift during the position adjustment by the third, fourth, and sixth dial gauges, the position adjustment by the first and second dial gauges is conducted again.

Then, the first plane 20 of the instrument 19 is made precisely in parallel to the Y-Z coordinate plane according to the same method as described above by using the fifth dial gauge 31 and one of the third dial gauge 29 and second dial gauge 30, and the position adjustment of the instrument 19 is performed so that these dial gauges display the predetermined same value. Simultaneously, the top end of the measuring probe of one of the first dial gauge 27 and second dial gauge 28 is caused to abut against the second plane 21 of the instrument 19 and the position adjustment of the instrument 19 is performed so that this dial gauge displays a predetermined value, whereby the postures of the robot around the remaining axial lines W, U and β are calibrated.

According to the above-mentioned procedures, the position of the instrument 19 is finally set so that all of the first through sixth dial gauges display the same values as the values on abutment of the gauge block.

Since a casing or the like of the wrist unit 15 need not be dismounted for the above-mentioned operation of setting the standard position, the operation can be performed very easily.

Figure 8:
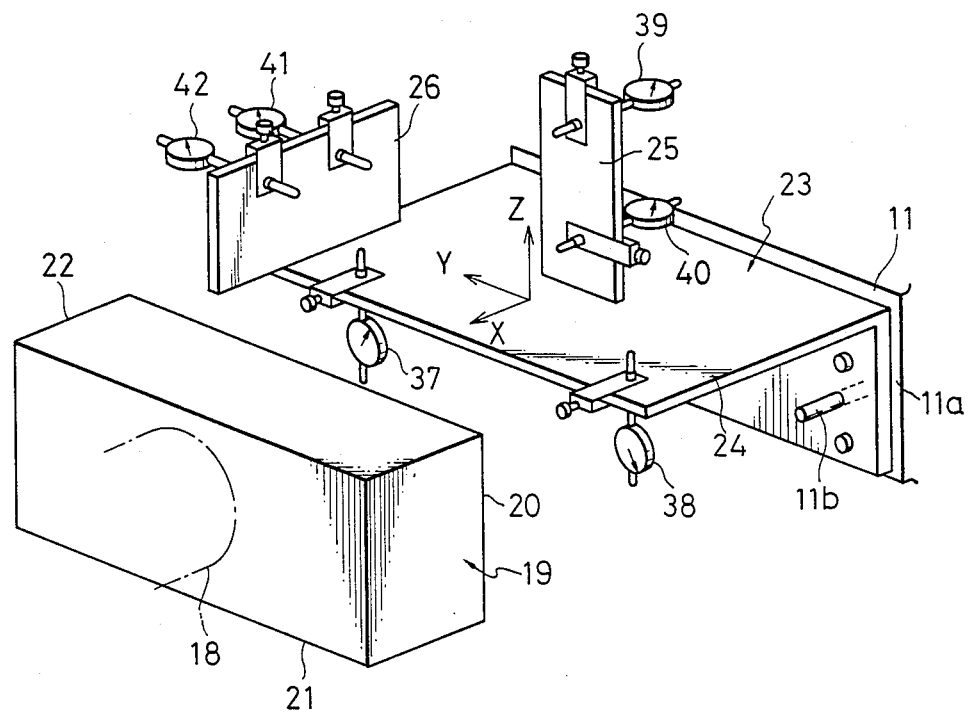

FIG. 8 shows another embodiment of the present invention. The same structural elements as in the foregoing embodiment are represented by the same reference numerals.

In this embodiment, dial gauges 37 through 42 are attached to the first through third frames 24, 25 and 26 of the supporting member 23 (two dial gauges for each frame). The first and second dial gauges 37 and 38 attached to the first frame 24 are caused to abut against the second plane 21 of the instrument 19 and are used for adjusting the parallelism of the first plane 21 to the X-Y coordinate plane and positioning the third first plane 21 relative to the X-Y coordinate plane. Furthermore, the third and fourth dial gauges 39 and 40 attached to the second frame 25 are caused to abut against the first plane 20 of the instrument 19 and are used for adjusting the parallelism of the first plane 20 to the Y-Z coordinate plane and positioning the plane 20 relative to the Y-Z coordinate plane. Furthermore, the fifth and sixth dial gauges 41 and 42 attached to the third frame 26 are caused to abut against the third plane 22 of the instrument 19 and are used for adjusting the parallelism of the plane 22 to the X-Z coordinate plane and positioning the plane 22 relative to the X-Z coordinate plane. Accordingly, the same functional effect as in the foregoing embodiment is similarly attained in this embodiment.

Although the embodiments illustrated in the accompanying drawings have been described, the present invention is not limited to the foregoing embodiments, but various modifications can be made to the structural elements within the claimed scope of the invention. For example, the dial gauges may be of the digital display system and may be attached to the frames of the supporting member in various modes.

CAPABILITY OF EXPLOITATION IN INDUSTRY

As is apparent from the foregoing description, according to the present invention, since a block to be measured, that is, an instrument, is attached to the top end portion of the wrist of an industrial robot and a supporting member for the measurement is attached to a fixing base of the robot, a casing of the wrist assembly need not be dismounted and the robot can be set at a standard posture on the basis of the fixing base very easily. The present invention can be applied to a five-axis articulated robot as well as the six-axis articulated robot described above.

We claim:

1. An apparatus for setting an industrial robot, comprising:
    one single block to be measured, which is dismountably attached to a tip end portion of a wrist of the industrial robot having movement about six axes, said one single block having three planes, orthogonal to one another, to be measured;
    block-positioning means for positioning the one single block relative to the tip end portion of the wrist so that the three planes to be measured of the one single block are set at predetermined positions relatively to the tip end portion of the wrist;
    a supporting member for the measurement which is attached to a fixing base of the industrial robot and has three frames orthogonal to one another;
    supporting member-positioning means for positioning said supporting member relative to said fixing base so that said frames take predetermined positions relative to three-axis orthogonal coordinates predetermined on the basis of the fixing base; and
    a plurality of dial gauges attached to predetermined positions of the frames to measure the planes to be measured of the one single block and to display predetermined values when the planes to be measured of the one single block are set at predetermined positions relative to the frames, said plurality of dial gauges measuring a distance between each of the orthogonal planes of the block and the corresponding orthogonal frames of the supporting member, said plurality of dial gauges measuring a parallel relationship between each of the three orthogonal planes of the block and the corresponding three orthogonal frames of the supporting member.

2. An apparatus as set forth in claim 1, wherein the dial gauges are preliminarily set by a gauge block fitted to the frames to display predetermined values.

3. An apparatus as set forth in claim 1, wherein one dial gauge is attached to one of said three frames, two dial gauges are attached to one of the remaining frames and three dial gauges are attached to the other remaining frame.

4. An apparatus as set forth in claim 1, wherein said block is attached to the tip end portion of the wrist so that one of the planes to be measured is orthogonal to the rotation axis of the tip end portion of the wrist.

* * * * *

UNITED STATES PATENT AND TRADEMARK OFFICE
CERTIFICATE OF CORRECTION

PATENT NO. : 4,813,844

DATED : March 21, 1989

INVENTOR(S) : Nobutoshi TORII et al

It is certified that error appears in the above-identified patent and that said Letters Patent is hereby corrected as shown below:

On the cover page, Item [30], "60-116758" should read

--60-116785--.

Signed and Sealed this

Thirtieth Day of January, 1990

*Attest:*

JEFFREY M. SAMUELS

*Attesting Officer*     Acting Commissioner of Patents and Trademarks